(12) United States Patent
Rozelle et al.

(10) Patent No.: US 6,205,265 B1
(45) Date of Patent: Mar. 20, 2001

(54) APPARATUS AND METHOD FOR ISOLATED PHOTOBLEACHING FIBER OPTIC ROTATION SENSOR COILS

(75) Inventors: David M. Rozelle, Woodland Hills; Ronald J. Michal, Wrightwood, both of CA (US)

(73) Assignee: Litton Systems, Inc., Woodland Hills, CA (US)

( * ) Notice: Subject to any disclaimer, the term of this patent is extended or adjusted under 35 U.S.C. 154(b) by 0 days.

(21) Appl. No.: 09/087,348

(22) Filed: May 29, 1998

(51) Int. Cl.$^7$ .............................. G02B 6/26; G02B 6/28; G02B 6/00
(52) U.S. Cl. ................... 385/15; 385/12; 385/24
(58) Field of Search ................... 385/12, 15, 24; 356/350

(56) References Cited

U.S. PATENT DOCUMENTS

| | | | |
|---|---|---|---|
| 4,915,503 | 4/1990 | Pavlath | 356/350 |
| 4,997,282 | 3/1991 | Pavlath | 356/350 |
| 5,037,205 | 8/1991 | Pavlath | 356/350 |
| 5,119,229 | 6/1992 | Grasso et al. | 359/341 |
| 5,231,465 | 7/1993 | Huang et al. | 356/350 |
| 5,537,671 | * 7/1996 | Toyama et al. | 356/350 |
| 5,774,217 | * 6/1998 | Lee et al. | 356/350 |
| 5,848,205 | * 12/1998 | Bigo | 365/15 |

FOREIGN PATENT DOCUMENTS

2252841 * 8/1992 (GB) .................... 385/12

OTHER PUBLICATIONS

"Photobleaching Effects in Optical Fiber Waveguides" Freibele & Gingrich Applied Optics vol. 20 Oct. 1981 pp. 3448–3352.

"Laser Induced Photobleaching at Low Temperature in Co–60 Irridiated Fibers" Barnes IEEE Annual Conf. Jul. 20, 1982 pp. 1479–1483.

* cited by examiner

Primary Examiner—Audrey Chang
Assistant Examiner—Jennifer Winstedt
(74) Attorney, Agent, or Firm—Lynn & Lynn

(57) ABSTRACT

Apparatus for minimizing the effects of radiation induced attenuation on a sense coil in a fiber optic rotation sensor includes apparatus for injecting photobleach light at a frequency selected to remove radiation-induced color centers. Wavelength division multiplexing optical couplers are used to introduce the photobleach light into the fiber optic rotation sensor system and then remove the photobleach light from the gyroscope optical circuit without effecting the gyro signal.

10 Claims, 4 Drawing Sheets

APPARATUS AND METHOD FOR ISOLATED PHOTOBLEACHING FIBER OPTIC ROTATION SENSOR COILS

BACKGROUND OF THE INVENTION

This invention relates generally to fiber optic rotation sensors and particularly to reducing sensitivity of such sensors to radiation environments. Still more particularly, this invention relates to photobleaching the sense coil of a fiber optic rotation sensor system to reduce sensitivity to radiation.

A typical fiber optic gyro uses a long length of polarization maintaining (PM) fiber as a sense element for rotation. It has been shown that this type of fiber is sensitive to radiation environments. When exposed to ionizing radiation, the fiber develops color centers that attenuate light propagating through the sense coil. If enough attenuation occurs, the random walk of the gyroscope will increase significantly. When the attenuation is extremely high due to large doses of ionizing radiation, the gyroscope will lose all signals.

SUMMARY OF THE INVENTION

The present invention minimizes the effects of radiation induced attenuation by photobleaching the sense coil. This is accomplished by injecting enough light at a frequency selected to remove the induced color centers. Since this light is at a different frequency from the light the gyroscope typically uses to sense rotation it must be introduced and removed from the gyroscope optical circuit without effecting the gyro signal.

Apparatus according to the present invention for photobleaching a fiber optic sense coil in a fiber optic rotation sensor system, comprises a photobleach light source and an optical fiber arranged to guide the photobleach light. A wavelength division multiplexing apparatus is connected to the optical fiber and arranged to introduce photobleach light into the fiber optic sense coil to anneal out color centers therein. The invention further includes apparatus arranged for removing the photobleach light from the fiber optic rotation sensor system.

The apparatus for removing the photobleach light from the fiber optic rotation sensor system includes a second wavelength division multiplexing optical coupler. The wavelength division multiplexing couplers may be formed to include the fiber optic leads of the sensing coil. Alternatively, the wavelength division multiplexing couplers may be formed to include the fiber optic sense coil.

The apparatus according to the present invention preferably further includes apparatus for dispersing the photobleach light that has been coupled out of the gyro.

An appreciation of the objectives of the present invention and a more complete understanding of its structure and method of operation may be had by studying the following description of the preferred embodiment and by referring to the accompanying drawings.

DESCRIPTION OF THE PREFERRED EMBODIMENT

This disclosure describes an apparatus and a method for isolated photobleaching fiber optic rotation sensor coils. Specific details are disclosed to provide a thorough description of the invention. However, it will be apparent that the present invention may be practiced without these specific details. Well-known components of the optical signal source according to the present invention are shown in block diagram form, rather than in detail, to avoid unnecessarily obscuring the invention.

Figure 1:
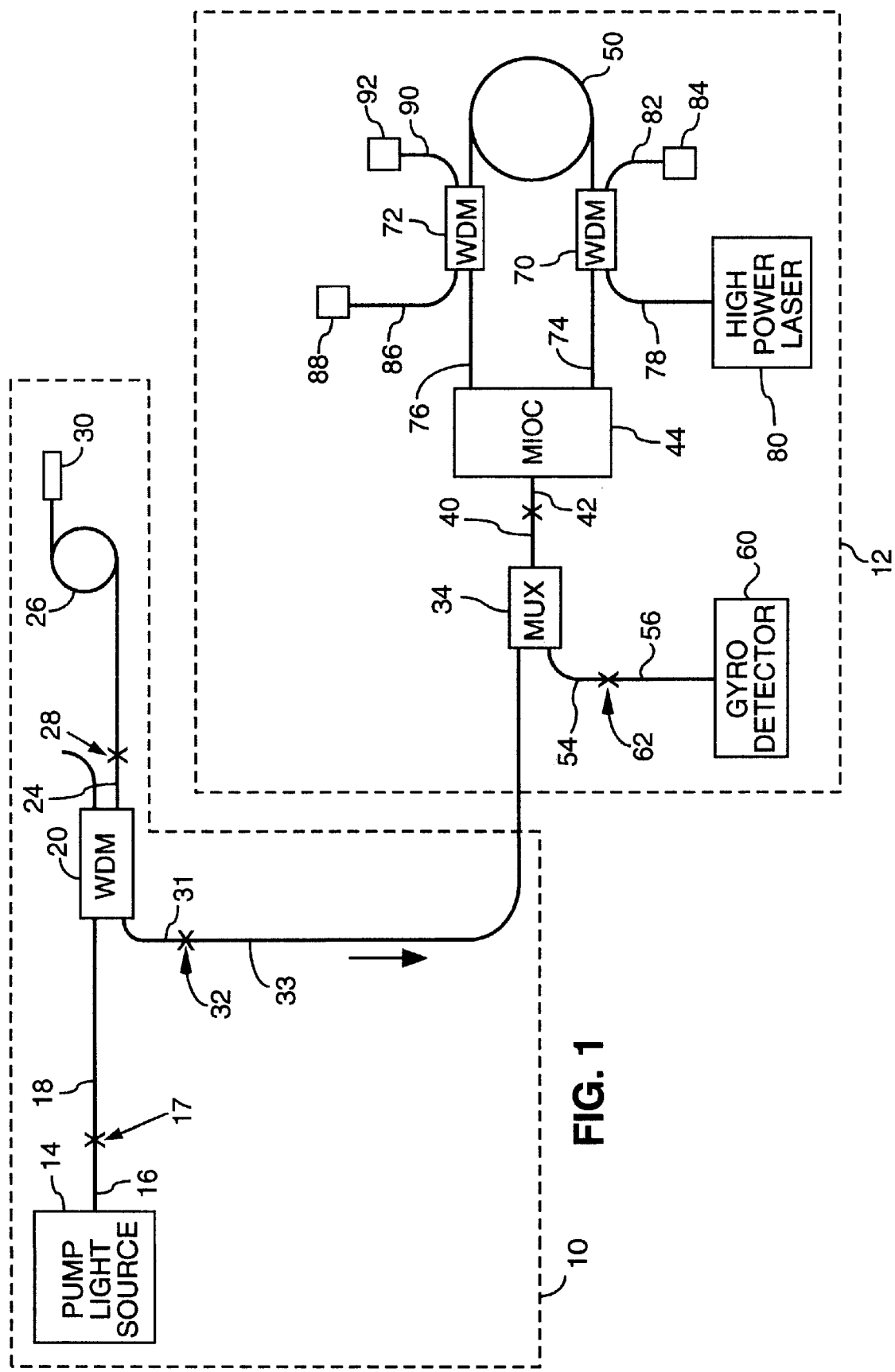
FIG. 1 illustrates apparatus according to a first embodiment of the present invention for photobleaching a fiber optic sense coil.

FIG. 1 illustrates a reverse pumped, single-pass optical signal source 10 arranged to provide optical signals to a fiber optic rotation sensor system 12. The particular optical signal source 10 disclosed is representative of a suitable type of optical signal source that may be used in practicing the present invention. The invention is not limited to the particular optical signal source 10 described herein. Any optical signal source suitable for use in a fiber optic rotation sensor may be used in the present invention.

The optical signal source 10 includes a pump light source 14, which preferably is a laser diode, arranged to output pump light at a fiber optic pigtail 16. A splice 17 connects an optical fiber 18 to the fiber optic pigtail 16. A wavelength division multiplexer (WDM) 20 has a fiber optic pigtail 18. The WDM 20 is a fiber optic coupler arranged to separate light beams of different wavelengths. The WDM 20 has a fiber optic pigtail 24 connected to a gain fiber 26 via a splice 28. The pump light propagates through the optical fiber 16 and the fiber optic pigtail 24 to the WDM 20. The WDM 20 allows the pump light to propagate to the gain fiber 26.

The pump light has a wavelength of 1480 nm in a preferred embodiment of the invention. The gain fiber 26 typically is an erbium-doped fiber, which is well-known in the art. The erbium-doped gain fiber 26 has a three level transition that produces a broad band optical signal having a wavelength centered at 1560 nm. U.S. Pat. No. 5,231,465, issued Feb. 8, 1991 to Phillips et al. and U.S. Pat. No. 5,119,229 issued Jun. 2, 1992 to Grasso et al. disclose the use of erbium-doped cores to provide optical signal in an optical fiber. The disclosures of U.S. Pat. No. 5,231,465 and U.S. Pat. No. 5,119,229 are hereby incorporated by reference into this disclosure.

The gain fiber 26 absorbs part of the pump light and emits light propagating lengthwise in both directions in the gain fiber 26. Light emitted in the direction of propagation direction of the pump light is referred to as forward light. The forward light exits the gain fiber 26 via an angled capillary 30, which terminates the gain fiber 26. Light emitted by the gain fiber 26 opposite in direction to the direction of propagation of the pump light is referred to as reverse light. The reverse light enters the WDM 20 via the pigtail 24 and exits the WDM 20 at a fiber optic pigtail 31. A splice 32 connects the pigtail 31 to an optical fiber 33.

The WDM 20 thus directs reverse emitted light from the gain fiber 26 into the optical fiber 33. The light coupled from the WDM 20 into the optical fiber 33 is the optical signal output from the optical signal source 10 to the fiber optic rotation sensor system 12.

A multiplexer 34 has a first fiber optic pigtail 33 connected to the optical fiber 31 via a splice 32. The multiplexer 34 has a second fiber optic pigtail 40 connected to a fiber optic pigtail 42 that extends from a multifunction integrated optics chip (MIOC) 44. The source light propagates through the multiplexer 34 to the MIOC 44, which includes well-known components (not shown) used to form and process the counter-propagating waves used in fiber optic rotation sensor systems. Suitable MIOC structures are disclosed in U.S. Pat. No. 4,915,503 (Pavlath); U.S. Pat. No. 4,997,282 (Pavlath); U.S. Pat. No. 5,037,205 (Pavlath), all of which are assigned to Litton Systems, Inc. The disclosures of U.S. Pat. Nos. 4,915,503; 4,997,282; 5,037,205 are hereby incorporated by reference into this disclosure.

The MIOC 44 then provides counter-propagating light beams to a fiber optic sense coil 50. Rotation of the fiber optic rotation sensor system 12 about a line perpendicular to the plane of the sense coil 50 produces a phase difference in the counter-propagating light beams by means of the Sagnac effect. After traversing the sense coil 50, the counter-propagating light beams combine in the MIOC 44 and form an interference pattern. The combined counter-propagating light beams then exit the MIOC 44 at the pigtail 42 and enter the multiplexer 34 via the pigtail 40. The combined counter-propagating light beams exit the multiplexer 34 via a fiber optic pigtail 54. The fiber optic pigtail 54 is connected to an input pigtail 56 of a photodetector 60 via a splice 62. The photodetector 60 produces electrical signals that indicate the light intensity in the interference pattern produced by combining the light beams that have propagated through the sense coil.

The return light from the sense coil 50 contains the rotation signal of the fiber optic rotation sensor system 12. It is this light that can be attenuated when the sense coil 50 is exposed to significant levels of ionizing radiation such as gamma radiation. After the sense coil 50 is removed from the source of the ionizing radiation the fiber optic sense coil 50 will start to recover. Many applications of fiber optic rotation sensors cannot afford the time necessary for the sense coil 50 to recover to a level were it is usable. Photobleaching according to the present invention increases the rate of recovery. Photobleaching under certain conditions can significantly reduce generation of color centers. Typically, high energy photons (shorter wavelengths) work best for photobleaching.

Figure 1A:
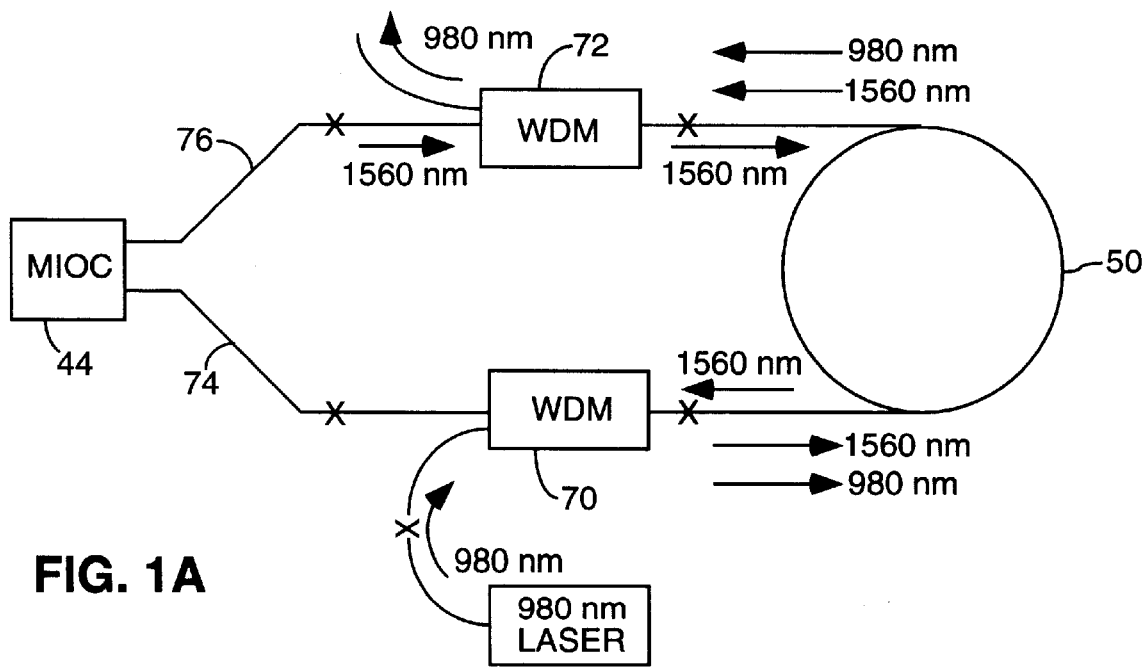
FIG. 1A is an expanded view illustrating photobleaching apparatus connected to a fiber optic sense coil.

FIG. 1 and FIG. 1A illustrate apparatus for introducing and removing light for the purpose of photobleaching the fiber optic sense coil 50. The photobleaching apparatus includes a pair of wavelength division multiplexers (WDMs) 70 and 72 that are added to the leads 74 and 76, respectively, of the sense coil 50. An optical fiber 78 is connected between the WDM 70 and a high power laser 80. An optical fiber 82 extends from the WDM 70 to terminate in an angle capillary 84. An optical fiber 86 is connected between the WDM 72 and an angle capillary 88. An optical fiber 90 extends from the WDM 72 to terminate in an angle capillary 92. In some applications the angle capillary 88 may be replaced by a high power laser similar to the laser 80.

Figure 2:
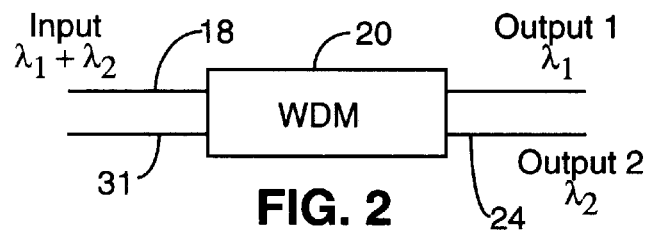
FIG. 2 illustrates a wavelength division multiplexer that may be included in the apparatus of FIG. 1.

Each of the WDMs 70 and 72 is preferably a fused fiber optic coupler comprising two input legs and two output legs with the ability to separate light beams of different wavelengths. The WDMs 70 and 72 are designed to operate at specific wavelengths. Typically two wavelengths enter a WDM from one of the input legs. One wavelength exits from one of the output legs. The second wavelength is designed to be cross coupled to a second output leg of the WDM as shown in FIG. 2.

In applying this operation to the fiber optic rotation sensor system of FIG. 1, the WDM 70 is used in the reverse fashion where the output leads serve become the input and the input leads serve as the output. Referring to FIG. 2, output 1 serves to provide a path for the fiber optic gyro light to be introduced into the fiber sense coil. Output 2 of the WDM 70 serves to introduce the photobleach light into the sense coil 50. In FIG. 1, output 2 of the WDM 70 is connected to a high power laser diode with a different wavelength than the gyroscope wavelength. Typically the photobleach wavelength is 980 nanometers and the gyroscope operating wavelength is 1560 nanometers.

The WDM 72 is used to remove the photobleaching light from the sense coil 50 by separating the wavelengths into its two output legs. If the light that is used to photobleach the coil is not removed from the detection circuitry, then the gyro will exhibit significant bias and scale factor errors. Only the 1560 nanometer gyroscope light is allowed to stay in the optical circuit for the gyro. The photobleaching light (980 nanometer) is coupled out of the optical circuit where it is scattered out of the system by the action of the angle capillary 88. In this way only the gyro light reaches the photodetector 60.

Typically WDMs are made with single mode non-polarization maintaining fiber. However, the fiber sense coil 50 typically is made with PM fiber. In order to ensure that there is no polarization drift associated with the single mode non-polarization maintaining sections, the WDMs 70 and 72 should be made with PM fiber.

The fast axes of the PM fibers used in the WDMs 70 and 72 are aligned with the fast axis of the PM fiber used in the sense coil 50. In this case the photobleaching laser diode 80 launches light into an arbitrary axis of the fiber 78. This light is then removed by the action of the WDM 72. However the gyro light is coupled in the sense coil 50 along the fast axis of the WDM 72 and coupled into the sense coil 50 fast axis.

As shown in FIG. 1A, the photobleaching light propagates in the counter-clockwise direction in the sense coil 50. In a preferred embodiment of the invention, the photobleaching light has a wavelength of 980 nm. The sense coil 50 guides the counter-propagating waves from the optical signal source 10. The counter-propagating waves are indicated by the right and left pointing arrows adjacent the WDMs 70 and 72. The 980 nm photobleaching light is coupled from the optical fiber 78 into the sense coil 50. The photobleaching light then traverses the length of the sense coil 50 and enters the WDM 72. The WDM 72 couples the photobleach light out of the gyro to the angle capillary 88 shown in FIG. 1, which is designed to prevent the photobleach light from reaching the MIOC 44.

Figure 3:
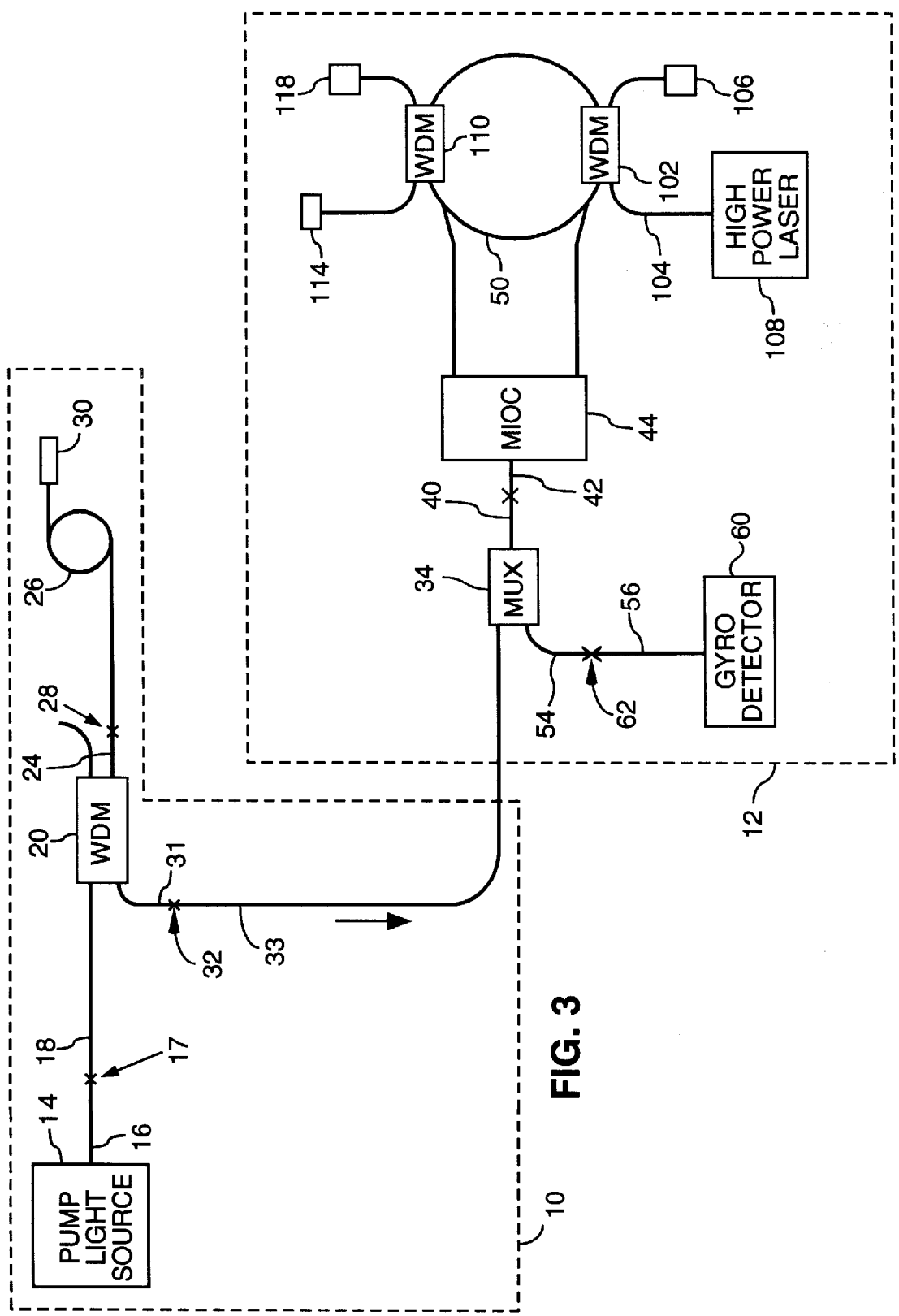
FIG. 3 illustrates a second embodiment of the present invention.

As shown in FIG. 3, the present invention may further be practiced with a pair of PM WDMs 102 and 110 integrated with the sense coil 50. In this case the photobleaching laser diode is pigtailed with PM fiber. The light from the photobleaching laser diode 108 is coupled into the PM pigtail 104 along the slow axis of the fiber. This light is then coupled into the fiber sense coil 50 via WDM 102 along the slow axis, which is the perpendicular axis to the gyro light. The gyro light propagates through the sense fiber coil 50 along the fast axis. This photobleaching light is then removed by the action of WDM 110. Any residual photobleaching light not removed by WDM 110 is in the wrong polarization orientation to pass through the integrated optics chip 44. The photobleaching light (980 nanometer) is coupled out of the optical circuit where it is scattered out of the system by the action of angle capillaries 106, 114 and 118 in the same manner as the angle capillary 88 of FIG. 1.

The MIOC 44 has a distributed polarizer (not shown) which rejects light not in the fast axis. This will isolate the gyro light from the photobleaching light by an additional 40 to 70 dB depending on the quality of the polarizer.

Figure 4:
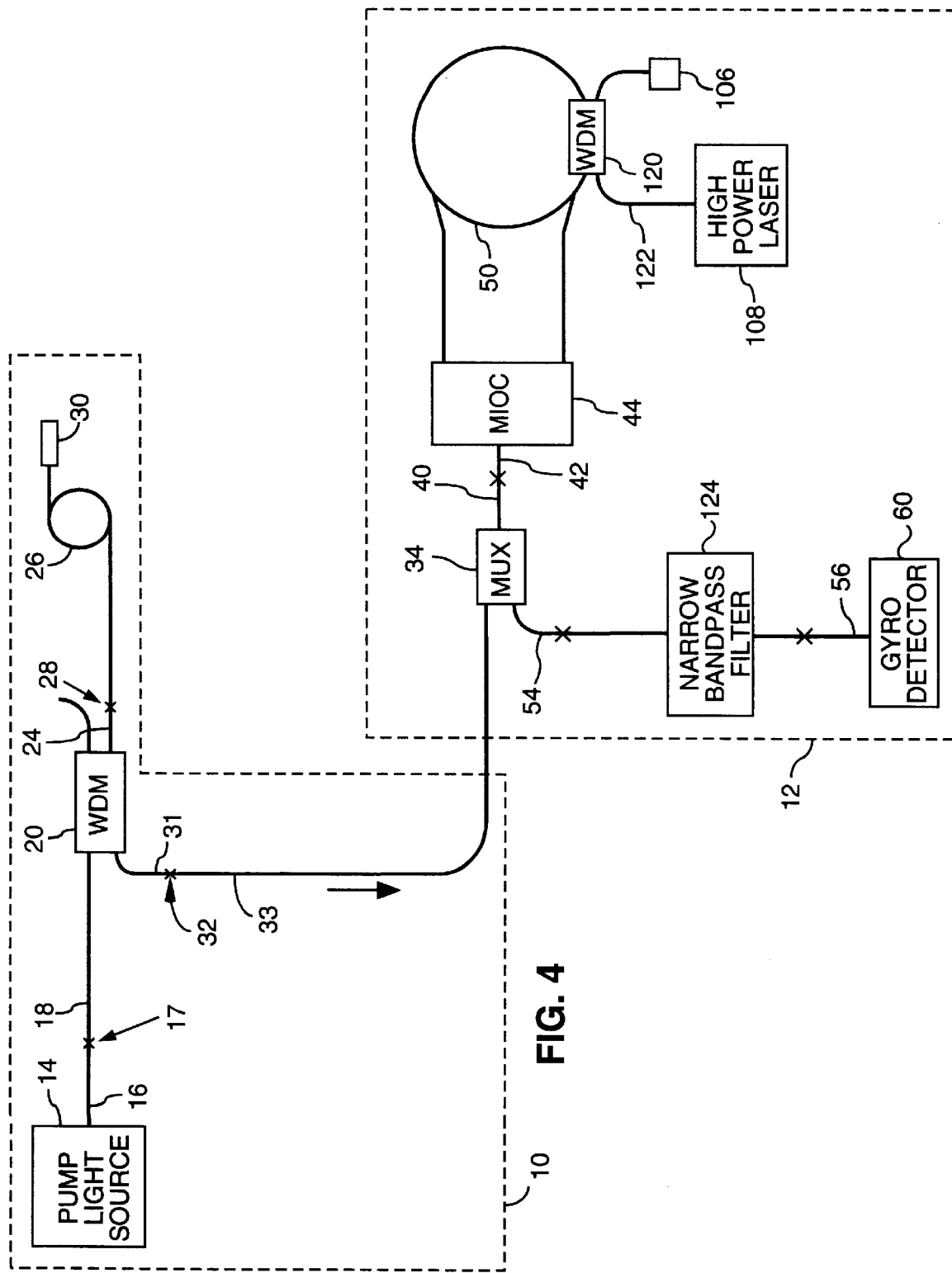
FIG. 4 illustrates a third embodiment of the invention.

As shown in FIG. 4, the present invention may be practiced with a single WDM 120 integrated with the sense coil 50. The WDM 120 includes a PM fiber 122 arranged to couple photobleach light into the sense coil 50. A narrow bandpass filter 124 is placed in the optical circuit between the multiplexer 34 and the photodetector 60 to prevent the photobleach light from reaching the photodetector 60.

An exemplary embodiment of the invention is disclosed herein to explain how to make and use the invention. The described embodiments are to be considered in all respects as exemplary and illustrative rather than restrictive. Therefore, the appended claims rather than the foregoing descriptions define the scope of the invention. All modifications to the embodiments described herein that come within the meaning and ranges of equivalence of the claims are embraced within the scope of the invention.

What is claimed is:

1. Apparatus for photobleaching a fiber optic sense coil in a fiber optic rotation sensor system, comprising:

a photobleach light source;

an optical fiber arranged to guide the photobleach light;

wavelength division multiplexing apparatus connected to the optical fiber and arranged to introduce photobleach light into the fiber optic sense coil to anneal out color centers therein, the wavelength division multiplexing apparatus including a first wavelength division multiplexing optical coupler formed to include a first fiber optic lead connected to the fiber optic sense coil;

apparatus arranged for removing the photobleach light from the fiber optic rotation sensor system including a second wavelength division multiplexing optical coupler formed to include a second fiber optic lead connected to the fiber optic sense coil and arranged to couple the photobleach light out of the second fiber optic lead; and apparatus connected to the second wavelength division multiplexing optical coupler for dispersing the photobleach light coupled out of the second fiber optic lead.

2. The apparatus of claim 1 wherein the first and second wavelength division multiplexing optical couplers are formed of polarization maintaining optical fiber.

3. Apparatus for photobleaching a fiber optic sense coil in a fiber optic rotation sensor system, comprising:

a photobleach light source;

an optical fiber arranged to guide the photobleach light;

wavelength division multiplexing apparatus connected to the optical fiber and arranged to introduce photobleach light into the fiber optic sense coil to anneal out color centers therein, the wavelength division multiplexing apparatus including a first wavelength division multiplexing optical coupler formed to include the fiber optic sense coil; and apparatus arranged for removing the photobleach light from the fiber optic rotation sensor system including includes a second wavelength division multiplexing optical coupler formed to include the sense coil and arranged to couple the photobleach light out of the sense coil; and apparatus connected to the second wavelength division multiplexing optical coupler for dispersing the photobleach light coupled out of the sense coil.

4. Apparatus for photobleaching a fiber optic sense coil in a fiber optic rotation sensor system, comprising:

a photobleach light source;

an optical fiber arranged to guide the photobleach light;

wavelength division multiplexing apparatus connected to the optical fiber and arranged to introduce photobleach light into the fiber optic sense coil to anneal out color centers therein, the wavelength division multiplexing apparatus including a wavelength division multiplexing optical coupler formed to include the fiber optic sense coil; and apparatus arranged for removing the photobleach light from the fiber optic rotation sensor system, including a bandpass filter arranged to filter optical signals output from the fiber optic sense coil.

5. The apparatus of claim 4 wherein the wavelength division multiplexing optical coupler is formed of polarization maintaining optical fiber.

6. A method for photobleaching a fiber optic sense coil in a fiber optic rotation sensor system to anneal out color centers therein, comprising the steps of:

providing a photobleach light source;

arranging an optical fiber arranged to guide photobleach light produced by the photobleach light source;

forming wavelength division multiplexing apparatus to include a first wavelength division multiplexing optical coupler formed to include a first fiber optic lead connected to the fiber optic sense coil;

connecting wavelength division multiplexing apparatus to the optical fiber;

arranging the wavelength division multiplexing apparatus to introduce photobleach light into the fiber optic sense coil to anneal out color centers therein;

removing the photobleach light from the fiber optic rotation sensor system with a second wavelength division multiplexing optical coupler formed to include a second fiber optic lead connected to the fiber optic sense coil and arranged to couple the photobleach light out of the second fiber optic lead; and connecting apparatus to the second wavelength division multiplexing optical coupler for dispersing the photobleach light coupled out of the second fiber optic lead.

7. The method of claim 6 including the steps of forming the first and second wavelength division multiplexing optical couplers of polarization maintaining optical fiber.

8. A method for photobleaching a fiber optic sense coil in a fiber optic rotation sensor system to anneal out color centers therein, comprising the steps of:

providing a photobleach light source;

arranging an optical fiber arranged to guide photobleach light produced by the photobleach light source;

forming wavelength division multiplexing apparatus to include a first wavelength division multiplexing optical coupler formed to include the fiber optic sense coil;

connecting wavelength division multiplexing apparatus to the optical fiber arranging the wavelength division multiplexing apparatus to introduce photobleach light into the fiber optic sense coil to anneal out color centers therein; and removing the photobleach light from the fiber optic rotation sensor system using a second wavelength division multiplexing optical coupler formed to include the sense coil and arranged to couple the photobleach light out of the sense coil; and connecting apparatus to the second wavelength division multiplexing optical coupler for dispersing the photobleach light coupled out of the sense coil.

9. A method for photobleaching a fiber optic sense coil in a fiber optic rotation sensor system to anneal out color centers therein, comprising the steps of:

providing a photobleach light source;

arranging an optical fiber arranged to guide photobleach light produced by the photobleach light source;

forming wavelength division multiplexing apparatus to include a first wavelength division multiplexing optical coupler formed to include the fiber optic sense coil;

connecting wavelength division multiplexing apparatus to the optical fiber;

arranging the wavelength division multiplexing apparatus to introduce photobleach light into the fiber optic sense coil to anneal out color centers therein; and removing the photobleach light from the fiber optic rotation sensor system using a bandpass filter arranged to filter optical signals output from the fiber optic sense coil.

10. The method of claim 9 including the step of forming the wavelength division multiplexing optical coupler of polarization maintaining optical fiber.

* * * * *